United States Patent [19]
Lindsey et al.

[11] 3,879,809
[45] Apr. 29, 1975

[54] HOT CONDUCTOR DEAD END CLAMP

[76] Inventors: Keith E. Lindsey, 110 El Nido, Pasadena, Calif. 91107; L. E. Lindsey, 2262 E. Mountain, Pasadena, Calif. 91104

[22] Filed: June 3, 1974

[21] Appl. No.: 475,394

[52] U.S. Cl. .......................... 24/135 M; 339/265 R
[51] Int. Cl. ........................... H01r 7/26; F16g 11/06
[58] Field of Search ..... 24/81 CC, 248 SA, 248 CR, 24/249 LS, 135 M; 403/79, 344; 339/245, 265; 248/63

[56] References Cited
UNITED STATES PATENTS

| | | | |
|---|---|---|---|
| 2,000,652 | 5/1935 | Snyder | 24/135 M X |
| 3,037,184 | 5/1962 | Bethea | 339/265 R |
| 3,284,863 | 11/1966 | Lindsey | 403/344 |
| 3,470,528 | 9/1969 | Farrington et al. | 339/265 R |
| 3,562,875 | 2/1971 | Lindsey et al. | 403/344 X |

*Primary Examiner*—Donald A. Griffin
*Attorney, Agent, or Firm*—Sellers and Brace

[57] ABSTRACT

A hot conductor clamp having a jaw pivotable to an open position laterally of the main body about the bight portion of one of two U-bolt clamps. The U-bolts are held assembled to the jaw by friction means including a spring keeper common to both bolts and effective to retain the U-bolts against unintended pivotal movement. The jaw includes means for limiting its opening movement as well as loop means engagable with a manipulating tool when opening and closing the jaw from a distance if the clamp is hot.

20 Claims, 6 Drawing Figures

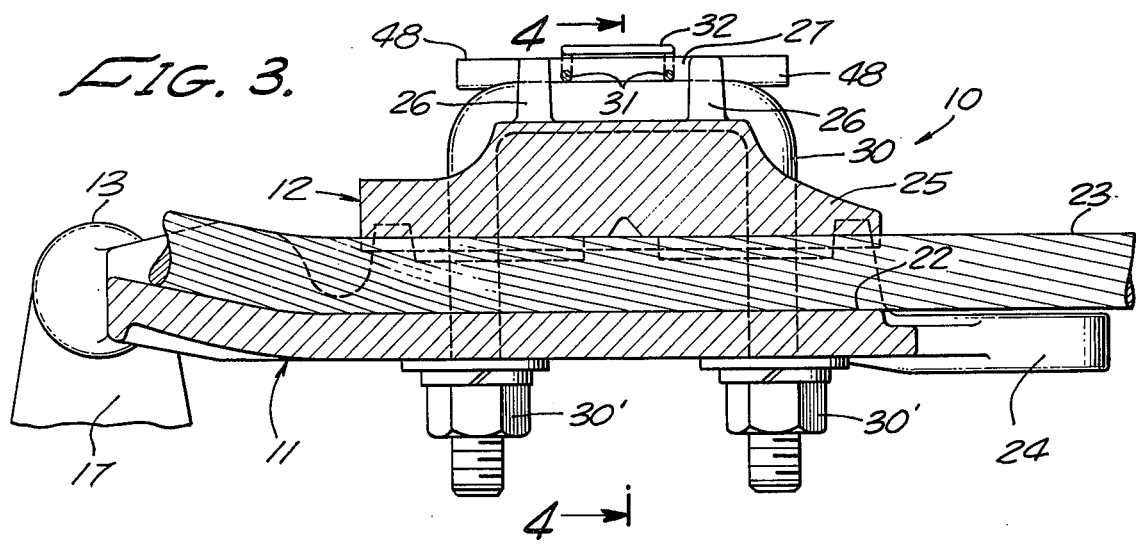
FIG. 3.
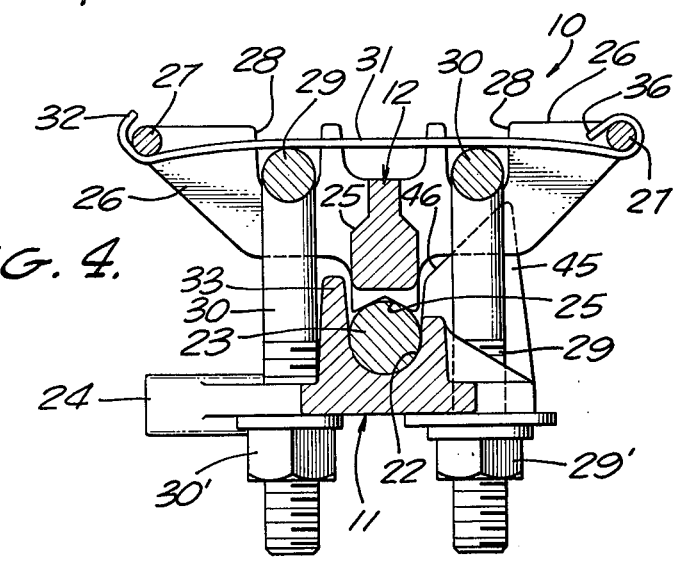
FIG. 4.
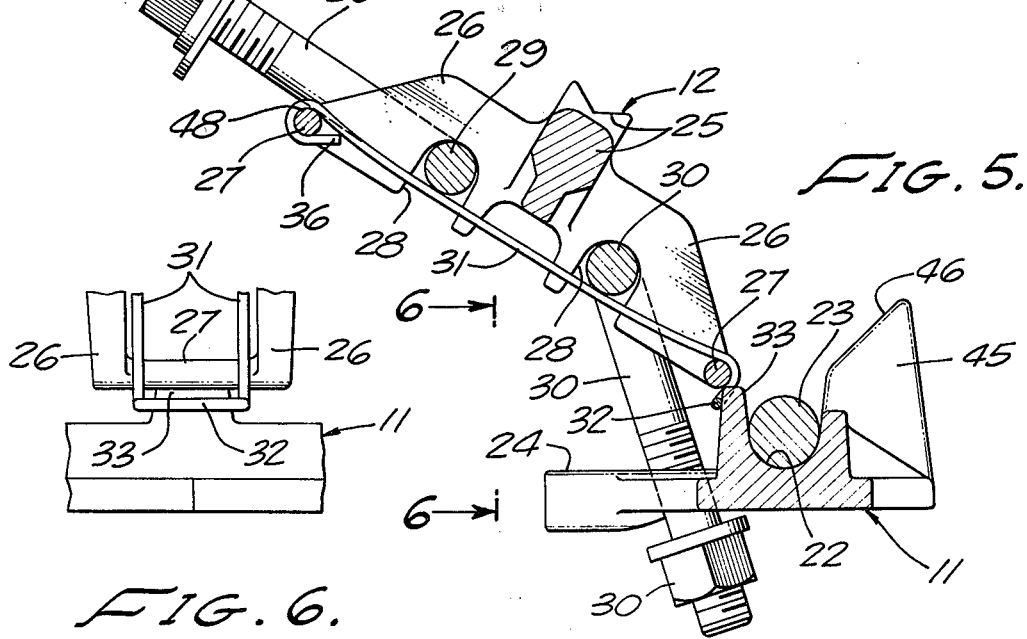
FIG. 5.
FIG. 6.

HOT CONDUCTOR DEAD END CLAMP

This invention relates to conductor clamps, and more particularly to a novel dead end clamp designed for opening and closing while hot using a hand-held manipulating tool.

Dead end clamps are used in large numbers on power lines to anchor power transmission conductors to insulators in a manner supporting the portion of the conductor between adjacent towers under a prescribed tensile strain. The conductor on the other side of the tower may be under a different tensile strain and is similarly connected to the tower. The adjacent ends of the two conductors are interconnected by a vertical loop normally free of strain. From time to time service operations are necessary and usually these must be carried out while the line is hot in order to maintain continuity of service to facilities served by the power line. In the interests of maximum safety to personnel, it is desirable that the dead end clamp be designed for servicing from a distance using hot line service tools.

Previous proposals have been made to meet these requirements, U.S. Pat. Nos. 3,284,863 granted to L. E. Lindsey on Nov. 15, 1966 and 3,562,875 granted to L. E. Lindsey and Herbert F. Sammons, on Feb. 16, 1971, being examples of such clamps. These clamps satisfy the requirements in a quite satisfactory manner, particularly under conditions having relatively low tensile strength requirements but are not suitable for use under more severe load conditions.

The present invention hot conductor clamp incorporates a number of unique features not heretofore proposed and has numerous advantages over prior designs including higher load capabilities, greater simplicity, lower manufacturing cost, greater safety, and substantially foolproof in operation. This improved clamp includes a specially designed clamping jaw held pivotally captive to the main body of the clamp by one of two U-bolts. The legs of the other U-bolt pivoted to the opposite side of the jaw are seatable in notches opening outwardly from the opposite side of the main body of the clamp. Both U-bolts are held captively assembled to the jaw by a common spring keeper which serves additionally to limit opening movement of the jaw and to frictionally resist rotation of the U-bolts relative to the jaw. Loops projecting from opposite sides of the jaw provide anchorages for the spring keeper as engagement members for a manipulating tool and as stops for one of the U-bolts.

Accordingly, it is a primary object of this invention to provide an improved, low-cost, high capacity, conductor dead end clamp readily and safely serviced while hot.

Another object of the invention is the provision of a hot conductor dead end clamp embodying numerous novel structural and functional features.

Another object of the invention is the provision of a dead end clamp having a clamping jaw held captively assembled to the main body of the clamp and adapted to be opened and reclosed from a distance by a hot line manipulating tool.

Another object of the invention is the provision of a hot conductor dead end clamp having improved means for holding the clamping bolts assembled to the clamping jaw as well as frictional means for holding the clamping bolts in any desired adjusted position while the clamp is open.

These and other more specific objects will appear upon reading the following specification and claims and upon considering in connection therewith the attached drawing to which they relate.

Referring now to the drawing in which a preferred embodiment of the invention is illustrated:

FIG. 3 is a fragmentary cross-sectional view taken along line 3—3 on FIG. 1;

FIG. 4 is a cross-sectional view taken along line 4—4 on FIG. 3;

FIG. 5 is a view similar to FIG. 4 but showing the clamping jaw firmly supported in open position; and FIG. 6 is a fragmentary view taken along line 6—6 on FIG. 5.

Figure 1:
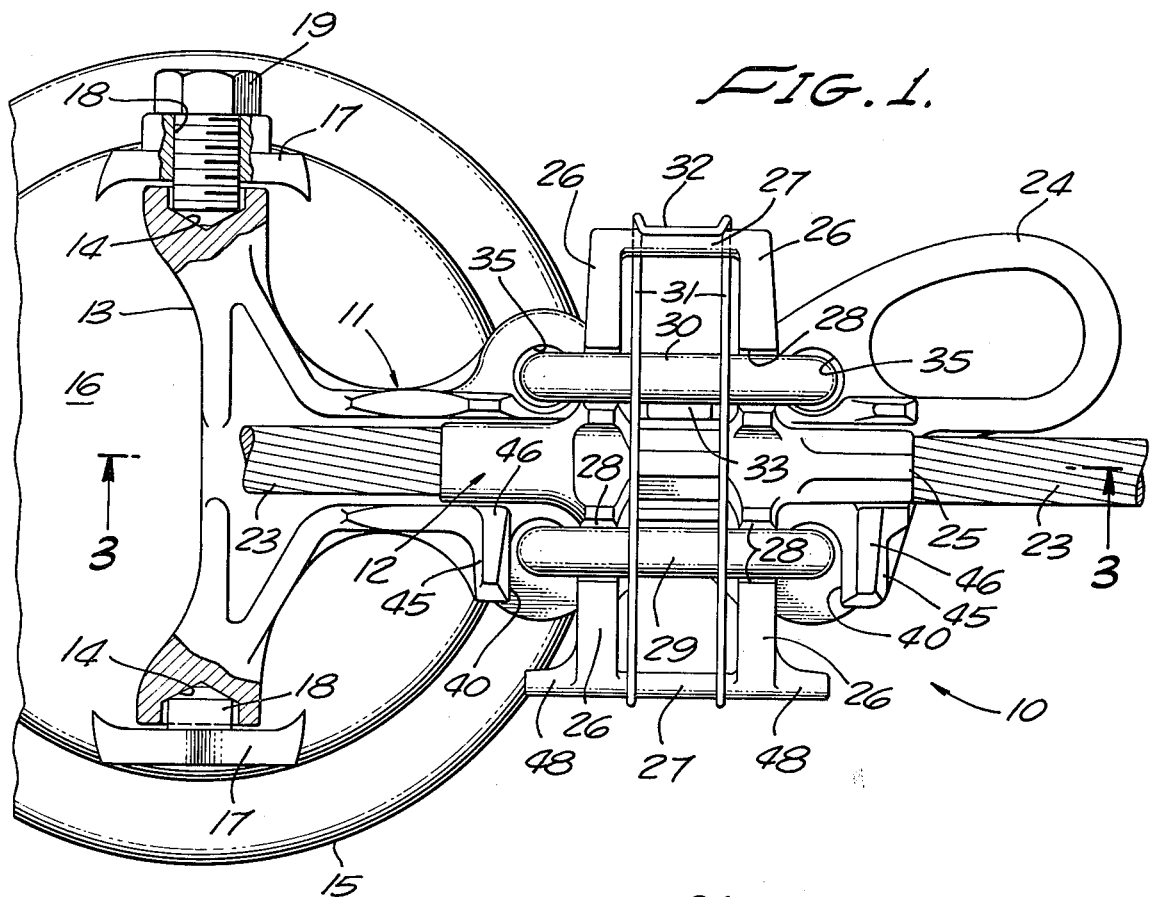
FIG. 1 is a top plan view of an illustrative embodiment of the dead end clamp shown fully assembled to a power conductor.
Figure 2:
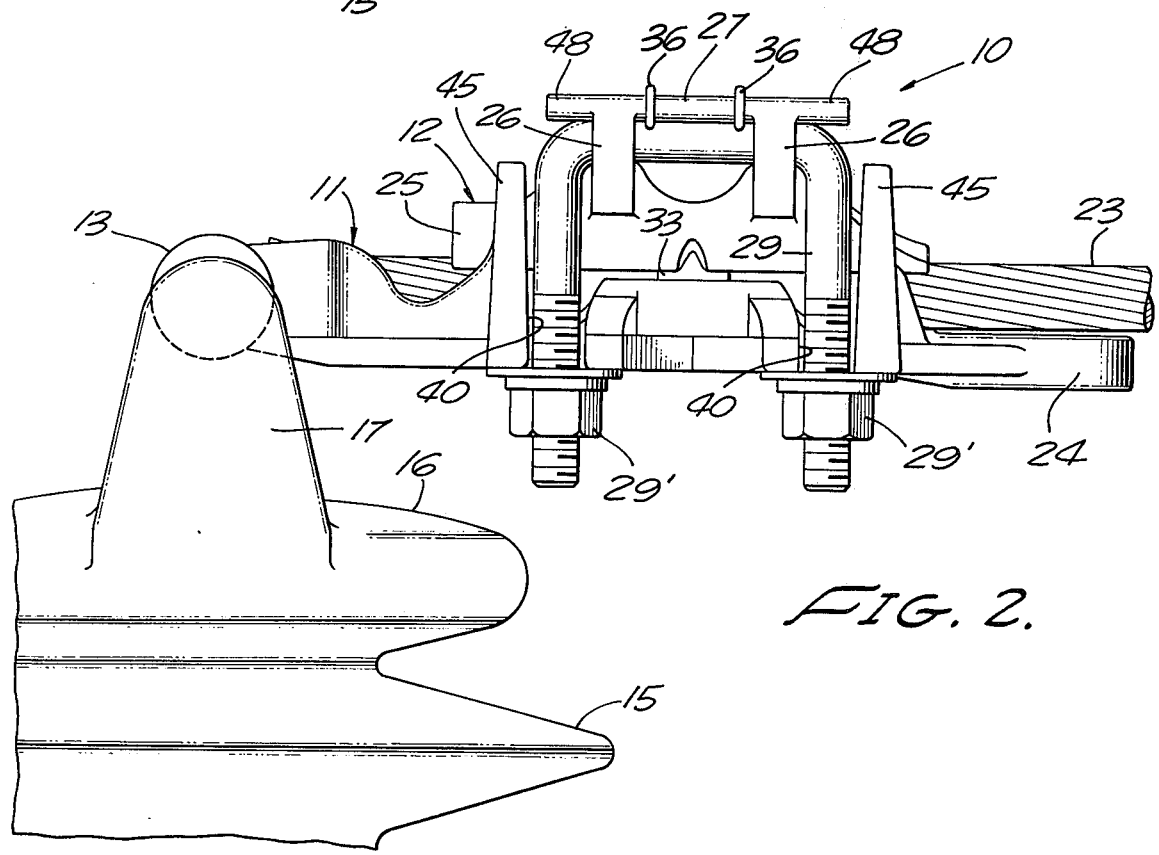
FIG. 2 is a side elevational view of FIG. 1.

Referring initially more particularly to FIGS. 1 and 2, there is shown the invention dead end clamp, designated generally 10. This clamp includes two high strength castings including a generally T-shaped main body 11 and a clamping jaw 12. It will be understood that the left hand end of main body 11 may include, as a mounting anchorage, either a T-head 13 or a clevis shaped terminal end, not shown, both types of mounting expedients being well known to persons skilled in this art. The T-head terminal end 13 here shown is provided with aligned wells 14,14 for seating trunnion-like members holding clamp 10 to an insulator. As here shown by way of example, an insulator 15 is provided with a typical end cap 16 having bosses 17 projecting upwardly from the diametrically opposed edges thereof. One of the bosses 17 includes an integral trunnion 18 extending into one of the wells 14, whereas the other boss has a threaded bore 18 seating an assembly cap screw 19 the inner end of which projects into the other well 14.

As best appears from FIG. 5, the T-stem portion of main body 11 is channel-shaped in cross-section to provide a seating groove 22 for the power conductor 23. This channel extends substantially the full length of the T-stem portion of the main body. The forward end of the main body also includes a large loop 24 (FIG. 1) into which the hook of a come-along tool is anchored, the other end of this tool being attached to conductor 23 in an area to the right of FIG. 1 in accordance with customary practice. The tool is operable in known manner to place the conductor under the required tension before closing and tightening clamping jaw 12. Thereafter, the come-along tool is released.

Clamping jaw 12 includes an alongated main body 25 overlying, when closed, a major portion of the conductor seating channel 22 in the main body of the clamp. Projecting laterally from the opposite sides of jaw 25 are a pair of U-shaped bosses or loops 26, 26 each having a bight portion 27 spaced well outwardly of and parallel to the jaw proper. The upper edges of the U-shaped loops 26 are deeply notched at 28, 28 (FIGS. 4 and 5) to provide journals in which the bight portion of a pair of U-bolts 29, 30 are seated.

These U-bolts are held frictionally pressed against the arcuate inner ends of notches 28 by a stiff spring wire keeper 31. Keeper 31 is formed in one piece of U-shaped wire stock and is held assembled to the jaw in the manner best shown in FIGS. 1 and 4. As there shown, the legs of the keeper overlie and are bowed against the bight portions of U-bolts 29, 30 with their opposite ends underlying the bight portions 27, 27 of the U-shaped loops 26, 26. The bight portion 32 of keeper 31 not only holds the legs of the keeper properly spaced from one another but also acts as a stop to limit pivotal movement of the clamping jaw to the open position shown in FIG. 5. Thus, the adjacent sidewalls of the conductor seating groove include a stop boss 33 projecting upwardly above the main body of the clamp into position to intercept and provide a stop for the bight portion 32 of keeper 31.

Assisting keeper 31 and stop 33 in supporting the jaw in this upwardly inclined open position is the U-bolt 30, the legs of which extend downwardly through openings 35 (FIG. 1) along the upper lateral side of the clamp main body as viewed in FIG. 1. In this connection it will be understood that openings 35 are sufficiently large to permit the U-bolt to tilt away from the vertical to a limited extent. The free ends 36 of the keeper legs are wrapped about the bight portions 27 of the U-shaped loops 26 (FIGS. 4 and 5) to retain the keeper in assembled position.

Referring to FIGS. 1 and 2, it will be understood that the legs of U-bolt 29 are normally seated in notches 40, 40 opening outwardly from one side of the main body of the clamp. The legs of U-bolt 29 are provided with clamping nuts 29' whereas the legs of bolt 30 are provided with clamping nuts 30' together with suitable washers. Once the U-bolts and nuts have been assembled, the outer ends of the threads on each leg are preferably upset to prevent accidental disassembly of the nuts.

An additional structural feature not described above is best shown in FIGS. 1, 2 and 5 and comprises a pair of guide bosses projecting upwardly at spaced points along that side of the clamp main body to which U-bolt 29 is assembled. Bosses 45 have an upwardly and outwardly inclined camming surface 46 which engages the adjacent lateral sides of jaw 25 during closing movement of the jaw. In this manner, the camming surfaces 46 assure accurate alignment of the clamping jaw with the conductor seating channel 22 as the jaw pivots toward closed position. Assurance is thereby provided that the jaw will seat in accurate alignment with the top of the conductor when closed and prior to tightening the nuts on the two U-bolts.

In operation, clamp 10 is assembled to an insulator in the usual manner and a cable tensioning device, such as a come-along tool not shown, is secured between loop 24 of the clamp and a portion of the conductor spaced outwardly away from insulator 15. This tool is then utilized to pull and hold the conductor to a desired tautness while the clamp is being tightened. During this period, jaw 25 is supported in the open position illustrated in FIG. 5. Once the conductor is in place and properly tensioned the jaw is closed and U-bolt 29 is rotated in journal 28 until its legs are properly seated in notches 40 (FIG. 1). Clamping nuts 29', 30' are then firmly tightened following which the come-along equipment can be detached.

At a subsequent date and when it becomes necessary for any reason to service the insulator or to open the clamp, a come-along device is re-attached between the conductor and loop 24. This work is performed in known manner while the conductor is hot. Thereafter, the workman utilizes long manipulating tools applied to nuts 29', 30' to loosen them to the position shown in FIG. 5. Thereupon the tool is used to pivot U-bolt 29 out of notches 40. Owing to the pressure applied by the spring keeper 31 against the bight portions of U bolts 29, 30 thereby pressing these bolts firmly against the bottoms of notches 28, the U-bolts are frictionally held in any rotated position. This prevents the legs of U-bolt 29 returning into notches 40.

The crewman then engages the hooked end of his manipulating tool beneath portion 27 of loops 26 and manipulates it to tilt the jaw to the fully open position shown in FIG. 5. As the jaw is tilted to a full upright position, it continues to pivot by gravity to its full open position. As it approaches this position the bight portion 32 of keeper 31 (FIG. 5) engages stop 33 and cooperates with U-bolt 30, as described above, in supporting the jaw in this upwardly inclined position. The projections 48, 48 projecting outwardly from the opposite ends of one of the clamping jaw U-loops 26 are positioned to engage the legs of U-bolt 29. Accordingly, there is no possibility that this U-bolt can pivot counterclockwise beyond the position shown in FIG. 5 where the jaw is open. The conductor seating channel 22 lengthwise of the main body is not fully exposed and the conductor can be released or a new one can be installed without risk of interference from the open jaw.

Once the servicing operations have been completedd the manipulating tool is again engaged with the outermost one of members 27 and used to rotate the jaw clockwise from the position shown in FIG. 5. As the jaw pivots past a vertical position it falls by gravity onto the conductor. In so doing, the camming surfaces 46 of bosses 45 engage the end portions of clamping jaw 25 and guide it into accurate alignment with the conductor and channel 22. The tool is then used to pivot U-bolt 29 until its legs are firmly seated at the inner ends of notches 40, 40 Nuts 29', 30' are now tightened by the aid of the long handled manipulating tool to clamp the conductor immovably in place following which the come-along tool is removed.

While the particular hot conductor dead end clamp herein shown and disclosed in detail is fully capable of attaining the objects and providing the advantages hereinbefore stated, it is to understood that it is merely illustrative of the presently preferred embodiment of the invention and that no limitations are intended to the detail of construction or design herein shown other than as defined in the appended claims. to be

We claim:

1. A hot conductor dead end clamp having an elongated main body provided with a conductor seating channel lengthwise thereof, an elongated conductor clamping jaw having boss means integral with and projecting laterally from either side of said jaw, first and second U-bolts having threaded legs, the bight portion of said U-bolts being journalled in a respective one of said boss means, the threaded legs of said first U-bolt being normally held captive in a respective pair of openings through one lateral side of said main body, the threaded legs of said second U-bolt being shiftable laterally into and out of notches opening outwardly laterally of the opposite side of said main body from said first U-bolt, and means for supporting said jaw and said second U-bolt inclined upwardly and outwardly from one lateral side of said main body when said jaw is pivoted to the open position thereof.

2. A hot conductor clamp as defined in claim 1 characterized in that the bight portions of said U-bolts are seated in notches along the opposite sides of said jaw, and means holding said U-bolts detachably assembled in said notches.

3. A hot conductor clamp as defined in claim 2 characterized in that said holding means for said U-bolts comprises spring means common to both of said U-bolts.

4. A hot conductor clamp as defined in claim 1 characterized in that said boss means integral with the opposite sides of said jaw is loop-shaped.

5. A hot conductor clamp as defined in claim 4 characterized in that one of said loop-shaped boss means is adapted to be engaged by a long hand-held manipulating tool effective to pivot said jaw between open and closed positions.

6. A hot conductor clamp as defined in claim 4 characterized in that one of said loop-shaped boss means includes means engageable with said main body to support said jaw in an open position elevated above and to one lateral side of said main body.

7. A hot conductor clamp as defined in claim 4 characterized in that one of said loop-shaped boss means includes means on the outer extremities thereof positioned to engage and support the legs of the adjacent one of said U-bolts in an elevated position inclined outwardly and upwardly away from said main body while said jaw is open.

8. A hot conductor clamp as defined in claim 1 characterized in the provision of means to hold said second U-bolt frictionally journalled to said jaw whereby said second U-bolt remains in any position to which the same is rotated about the axis of its bight portion.

9. A hot conductor clamp as defined in claim 1 characterized in the provision of spring keeper means extending crosswise of the bight portion of at least one of said bolts and effective to hold the same assembled and frictionally resisting pivoting of the U-bolt about the axis of the bight portion thereof.

10. A hot conductor clamp as defined in claim 1 characterized in the provision of common spring keeper means extending crosswise of the bight portions of said first and second U-bolts for holding said U-bolts detachably assembled to said boss means.

11. A hot conductor clamp as defined in claim 1 characterized in the provision of friction means interposed between said second U-bolt and said jaw resisting rotary movement of said second U-bolt about the bight portion thereof whereby said U-bolt remains stationary until forcibly shifted to a different position in the journal therefor.

12. A hot conductor clamp having an elongated channel shaped main body adapted to seat a hot conductor, a clamping jaw including first clamping bolt means holding the same movably assembled to one lateral side of said main body, second clamping bolt means pivotally supported on said jaw and for pivotal movement crosswise of said jaw and into and out of a notch in the outer side of said main body, and friction means resisting pivotal movement of said second clamping bolt means and effective to hold said second bolt in one selected position until deliberately shifted to another selected holding position whereby said jaw may be manipulated and pivoted between open and closed position without risk of said second clamping bolt means shifting position relative to said jaw.

13. A clamp as defined in claim 12 characterized in that said friction means is effective to hold said second bolt means detachably assembled to said jaw.

14. A clamp as defined in claim 13 characterized in that said friction means is common to said first and second bolt means.

15. A hot conductor dead end clamp having an elongated main body of channel shape in cross-section, means at one end of said main body for securing the same to a fixed anchorage, an elongated clamping jaw including means movably connecting said jaw to one side of said main body for movement between a closed position opposite the interior bottom wall of said channel and an open position along one lateral side of said channel, and means projecting upwardly and outwardly away from the interior bottom of said channel along the other lateral side of said channel and having a camming surface positioned to engage and pilot said elongated jaw into alignment with said channel while moving from the open to the closed position thereof.

16. A hot conductor clamp as defined in claim 15 characterized in that said camming means for said jaw are positioned to engage the opposite end portions of said jaw.

17. A hot conductor clamp as defined in claim 15 characterized in that said means movably connecting said jaw to said main body includes first and second U-bolts having threaded legs, means for holding the bight portions of said U-bolts journalled generally parallel to end along a respective side of said jaw, and the threaded legs of one of said U-bolts extending through openings along one side of said main body and the threaded legs of the other U-bolt being shiftable laterally into and out of seating engagement in notches opening outwardly from the other lateral side of said main body.

18. A hot conductor clamp as defined in claim 17 characterized in the provision of common keeper means for holding each of said U-bolts captively assembled to said jaw.

19. A hot conductor clamp as defined in claim 15 characterized in that said jaw includes means projecting laterally from one side thereof positioned to engage the adjacent lateral side of said main body to limit the opening movement of said jaw and to support the same in an elevated position above and to one lateral side of said main body when said jaw is open.

20. A hot conductor clamp as defined in claim 15 characterized in that said jaw includes loop means projecting from one lateral side thereof and adapted to be engaged by one end of a hand-held manipulating tool to shift said clamp between the open and closed positions thereof.

* * * * *